(12) United States Patent
Yestrau

(10) Patent No.: US 10,207,431 B2
(45) Date of Patent: Feb. 19, 2019

(54) SYSTEM, METHOD, AND TOOL ASSEMBLY FOR REMOVING A COMPONENT FROM A MANDREL ASSEMBLY

(71) Applicant: THE BOEING COMPANY, Chicago, IL (US)

(72) Inventor: John Yestrau, Manitoba (CA)

(73) Assignee: The Boeing Company, Chicago, IL (US)

( * ) Notice: Subject to any disclaimer, the term of this patent is extended or adjusted under 35 U.S.C. 154(b) by 261 days.

(21) Appl. No.: 15/007,659

(22) Filed: Jan. 27, 2016

(65) Prior Publication Data

US 2017/0210039 A1     Jul. 27, 2017

(51) Int. Cl.
*B23P 19/04*     (2006.01)
*B29C 37/00*     (2006.01)
*B29L 31/30*     (2006.01)

(52) U.S. Cl.
CPC ... *B29C 37/0007* (2013.01); *B29L 2031/3076* (2013.01)

(58) Field of Classification Search
CPC ......... B23P 11/00; B23P 11/027; B23P 19/00; B23P 19/02; B23Q 1/00; B23Q 1/03; B23Q 1/25
See application file for complete search history.

(56) References Cited

U.S. PATENT DOCUMENTS

| 4,726,575 | A | * | 2/1988 | Dearman | ........... | B23K 37/0533 |
| | | | | | | 269/131 |
| 5,573,229 | A | * | 11/1996 | Lycan | ................ | B23K 37/0533 |
| | | | | | | 269/43 |
| 7,798,285 | B2 | | 9/2010 | Chiou | | |
| 2013/0126265 | A1 | | 5/2013 | Sternberger | | |
| 2015/0174706 | A1 | * | 6/2015 | McClure | ............ | B23K 37/0533 |
| | | | | | | 269/45 |
| 2017/0210039 | A1 | * | 7/2017 | Yestrau | ............... | B29C 37/0007 |

* cited by examiner

*Primary Examiner* — Lee D Wilson
(74) *Attorney, Agent, or Firm* — Joseph M. Butscher; The Small Patent Law Group, LLC

(57) ABSTRACT

A component-removal tool assembly is configured to remove a component from a mandrel assembly, and may include a main frame, and a plurality of rotational input devices extending from the main frame. Each rotational input device may be operatively coupled to a respective plunger that is configured to be actuated against a portion of the mandrel assembly. A synchronizing link synchronously couples the rotational input devices together. The synchronizing link operates to synchronize movement of the plurality of rotational input devices. Movement of one or more of the rotational input devices causes the plungers coupled thereto to exert a uniform and consistent disconnecting force against the mandrel assembly.

20 Claims, 8 Drawing Sheets

SYSTEM, METHOD, AND TOOL ASSEMBLY FOR REMOVING A COMPONENT FROM A MANDREL ASSEMBLY

FIELD OF THE DISCLOSURE

Embodiments of the present disclosure generally relate to systems and methods for forming a component, such as an acoustic inlet barrel of an engine assembly of a jet aircraft, and, more particularly, to a system, method, and tool assembly for removing a formed component from a mandrel assembly.

BACKGROUND OF THE DISCLOSURE

Jet aircraft typically include one or more engines that may generate high levels of noise. For example, a fan within a housing secured to a wing of an aircraft typically generates noise. Often, engine housings include one or more sound dampening structures that are used to absorb at least a portion of the noise generated by components of an engine. For example, an acoustic inlet barrel may be positioned within the engine housing upstream from a fan.

Known acoustic inlet barrels may be formed of composite materials, such as carbon-reinforced plastics, that are sandwiched around an acoustic core. Each acoustic inlet barrel is generally formed of multiple pieces. For example, each acoustic inlet barrel may be formed of two or three pieces that are secured together by fasteners, such as bolts. Bulky bolt flanges are formed on the pieces and used to connect the pieces together with the separate and distinct fasteners. However, the bolt flanges add mass to the acoustic inlet barrel. Moreover, the process of securing the pieces together is generally labor and time intensive. Further, because each acoustic inlet barrel is formed from separate and distinct pieces that are secured together through fasteners, the integrity of the formed acoustic inlet barrel may be compromised through joints, seams, and the like between the pieces. Further, the areas on and around the joints, seams, and the like may exhibit less than optimal acoustical characteristics.

One known system and method of efficiently forming a one piece acoustic inlet barrel involves the use of a two piece mandrel assembly, also known as a bond assembly jig. After being cured in an autoclave, the acoustic inlet barrel is demolded or otherwise removed from the mandrel assembly. However, the complex curvature of the mandrel assembly, combined with adhesion forces of cured resin, often lead to a time-consuming, complex, and inconsistent demolding process.

SUMMARY OF THE DISCLOSURE

Accordingly, a need exists for a system and method of quickly, efficiently, and safely removing a component (such as an acoustic inlet barrel) from a mandrel assembly. A need exists for a simple, safe, uniform, and controlled method of demolding or otherwise removing a component from a mandrel assembly.

With those needs in mind, certain embodiments of the present disclosure provide a component-removal tool assembly configured to remove a component from a mandrel assembly. The component-removal tool assembly may include a main frame, and a plurality of rotational input devices extending from the main frame. Each of the rotational input devices may be operatively coupled to a respective plunger that is configured to be actuated into a portion of the mandrel assembly. A synchronizing link synchronously couples the plurality of rotational input devices together. The synchronizing link operates to synchronize movement of the rotational input devices. Movement of one or more of the rotational input devices causes the plungers coupled to the plurality of rotational input devices to exert a uniform and consistent disconnecting force against the mandrel assembly.

In at least one embodiment, the synchronizing link may include a single, common roller chain coupled to each of the plurality of rotational input devices. Each of the rotational input devices may include a gear operatively coupled to the single, common roller chain. The main frame may include one or more sprockets operatively coupled to the single, common roller chain. Each of the rotational input devices may be threadably coupled to a respective plunger.

The component-removal tool assembly may be used to separate an upper ring from a tower of the mandrel assembly. Additionally, the component-removal tool assembly may be used to separate the component from the tower.

The main frame may include one or more lift rings. The lift ring(s) are configured to be engaged by a lifting device.

The component-removal tool assembly may include one or more securing brackets. The securing bracket(s) are configured to removably secure to the component and a portion of the mandrel assembly through one or more restraining pins.

Certain embodiments of the present disclosure provide a separating system that may include a mandrel assembly including an upper ring removably secured to a tower, a cured composite component secured around at least a portion of the tower, and a component-removal tool assembly configured to initially remove the upper ring from the tower and subsequently remove the component from the tower.

The component-removal tool assembly may include a main frame, and a plurality of rotational input devices extending from the main frame. Each of the rotational input devices may be operatively coupled to a respective plunger that is actuated against a portion of the mandrel assembly. A synchronizing link synchronously couples the rotational input devices together. The synchronizing link operates to synchronize movement of the rotational input devices. Movement of one or more of the rotational input devices causes the plungers coupled to the plurality of rotational input devices to exert a uniform and consistent disconnecting force into the mandrel assembly.

In order to remove the component from the mandrel assembly, the component-removal tool assembly is initially positioned on the tower and secured to the upper ring. At least one of the rotational input devices is initially rotated to separate the upper ring from the tower. The component-removal tool assembly is initially moved off of the tower to remove the upper ring from the tower. The upper ring is removed from the component-removal tool after the component-removal tool assembly is initially moved off of the tower. The component-removal tool assembly is re-positioned on the tower and secured to the component. At least one of the rotational input devices is subsequently rotated to separate the component from the tower. The component-removal tool assembly is subsequently moved off of the tower to remove the component from the tower. The component is removed from the component-removal tool after the component-removal tool assembly is subsequently moved off of the tower.

Certain embodiments of the present disclosure provide a method of removing a cured, composite component from a mandrel assembly. The method may include positioning a component-removal tool assembly on a tower of the mandrel assembly, securing the component-removal tool assembly to an upper ring that connects to the tower, initially rotating at least one of a plurality of synchronized rotational input devices in a disconnecting direction to separate the upper ring from the tower, initially moving the component-removal tool assembly off of the tower to remove the upper ring from the tower, removing the upper ring from the component-removal tool after the component-removal tool assembly is moved off of the tower, re-positioning the component-removal tool assembly on the tower, securing the component-removal tool to the component, subsequently rotating the plurality of synchronized rotational input devices in the disconnecting direction to separate the component from the tower, subsequently moving the component-removal tool assembly off of the tower to remove the component from the tower, and removing the component from the component-removal tool after the component-removal tool assembly is subsequently moved off of the tower.

In at least one embodiment, the initially and subsequently rotating operations comprise actuating a plurality of plungers operatively coupled to respective ones of the synchronized rotational input devices into a portion of the tower. The method may also include synchronizing the synchronized rotational input devices together through a synchronizing link. The synchronizing link may include a single, common roller chain. The initially and subsequently moving operations may include removably connecting the component-removal tool assembly to a lifting device through one or more lift rings.

DETAILED DESCRIPTION OF THE DISCLOSURE

Figure 1:
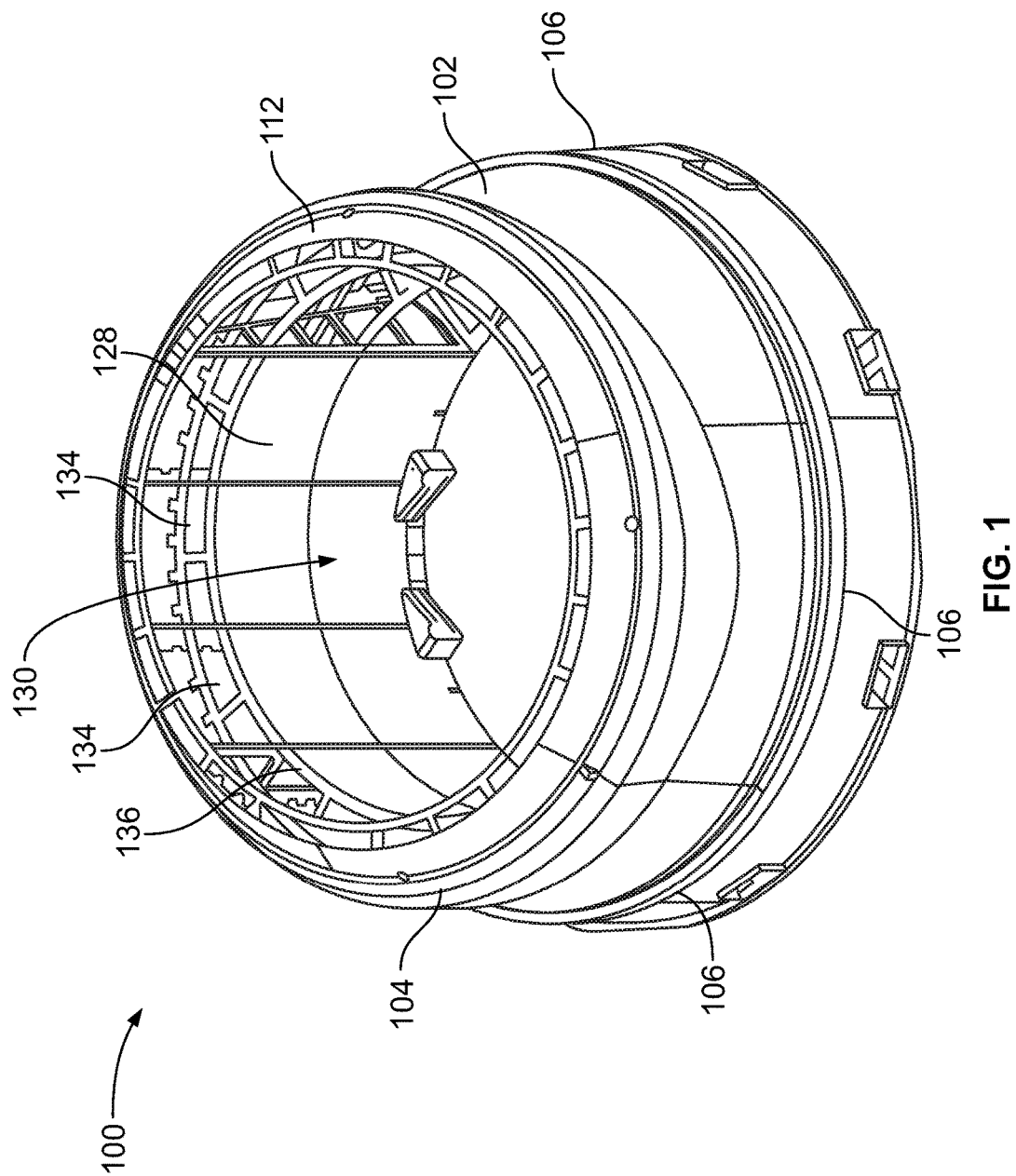
FIG. 1 illustrates a perspective top view of a mandrel assembly, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a simple, safe, uniform, and controlled system and method of demolding or otherwise removing a component (such as an acoustic inlet barrel) from a mandrel assembly. The system and method may use a component-removal tool assembly that may be devoid of hydraulics, pneumatics, and electronics. In at least one embodiment, the component-removal tool assembly may include a plurality of synchronized rotational input devices (that is, wheels that are configured to be grasped and rotated by an individual) operatively connected to plungers that are coordinated to collectively push against a portion of a mandrel assembly to counteract adhesion forces of resin. The rotational input devices may include shafts or other such axles that are coupled to one or more gears or sprockets, which may be synchronously coupled to a common roller chain that ensures even, level, and consistent separation and removal of the component from the mandrel assembly.

In at least one embodiment, the component-removal tool assembly may include rotational input devices that are coupled to plungers that are mechanically and synchronously coupled to a common roller chain. The component-removal tool assembly is used to demold or otherwise remove a component from a mandrel assembly without the use of auxiliary power sources, and without the risk of damaging the component or the mandrel assembly.

In at least one embodiment, the component-removal tool assembly may include three synchronized rotational input devices, each of which may be connected to a synchronizing link, such as a common roller chain. Each of the rotational input devices is operatively coupled to a respective plunger. All three of the rotational input devices are synchronized, such that as one rotational input device is turned, all of the plungers move in the same manner at the same time. By turning one rotational input device, uniform pressure is applied against a main portion (for example, a tower) of a mandrel assembly, allowing the component (and/or other another portion of the mandrel assembly) to be separated from the main portion of the mandrel assembly in an even and consistent manner.

Embodiments of the present disclosure may be used to remove various components from a mandrel assembly. For example, the component-removal tool assembly may be used to remove a formed and cured composite acoustic inlet barrel from the mandrel assembly. The component-removal tool assembly may be used to remove various other circular or ring-like components from a mandrel assembly, such as a portion of a fuselage, a motor casing, and/or the like.

FIG. 1 illustrates a perspective top view of a mandrel assembly 100, according to an embodiment of the present disclosure. The mandrel assembly 100 may be a bond assembly jig. The mandrel assembly 100 may include a main structure, such as a tower 102, an upper ring 104 removably secured to the tower 102, and one or more lower fairing members 106, such as bars, rims, or the like, secured around a lower portion of the tower 102. Alternatively, the mandrel assembly 100 may not include the fairing members 106.

Figure 2:
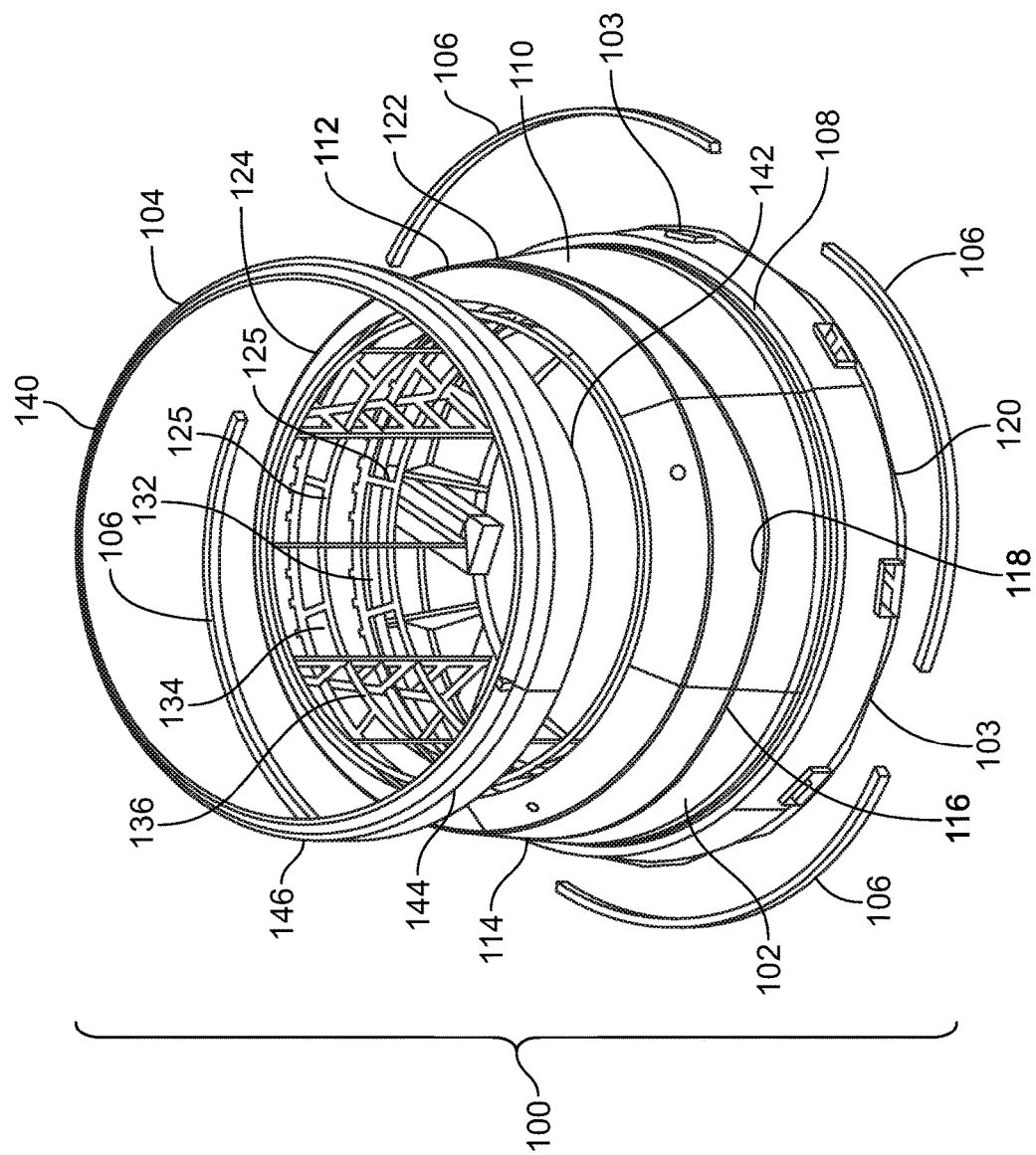
FIG. 2 illustrates a perspective top exploded view of a mandrel assembly, according to an embodiment of the present disclosure.

FIG. 2 illustrates a perspective top exploded view of the mandrel assembly 100. The tower 102 includes an annular base 103 having an upper ledge 108 that extends around the tower 102. An outer forming wall 110 extends upwardly from the upper ledge 108 and connects to a beveled upper rim 112.

The outer forming wall 110 includes an upper recess 114 formed therein. The upper recess may be defined by a lower ledge 116 that wraps around the outer forming wall 110. The lower ledge 116 may have a variable depth around the outer forming wall 110. For example, a depth 118 proximate to one side 120 of the tower 102 may be lower than a depth 122 proximate to an opposite side 124 of the tower 102.

The tower 102 includes multiple interior support structures 125, such as ribs, braces, beams, struts, trusses, and/or the like defining interior spaces therebetween. An interior liner jacket 128 (shown in FIG. 1), such as formed of aluminum, may be secured to interior surfaces of the support structures 125. The interior liner jacket 128 may circumferentially extend around an interior of the tower 102, thereby defining a central passage 130 (shown in FIG. 1) through the mandrel assembly 100. The interior liner jacket 128 forms a barrier past which air is unable to pass. As such, a duct 132 may be defined between the interior liner jacket 128 and the outer forming wall 110. An opening may be formed at a bottom end of the base 108 to allow gas, such as air, to flow into the duct 132. Gas outlet channels 134 may be formed within a circumferential rim 136 that connects to an upper edge of the liner jacket 128.

During a curing process, the liner jacket 128 channels gas, such as forced air, into the duct 132, instead of into the central passage 130. In this manner, the duct 132 provides increased heat transfer in relation to the outer forming wall 110, such as through convection, as opposed to forced air that migrates into and flows in and through the central passage 130.

Each lower fairing member 106 is configured to be supported on the upper ledge 108 of the base 103. The lower fairing members 106 are configured to connect together, such as through snap-fit, latching, or other such connection, to form an annular member secured on the upper ledge 108. For example, one end of each fairing member 106 may include a plug portion that removably connects to a reciprocal receptacle end of a neighboring fairing member 104. While four fairing members 104 are shown, more or less fairing members may be used. For example, two or three fairing members 106 may form an annular member supported on the upper edge 108 of the base 103. Alternatively, a single, unitary fairing member in the form of a single formed ring may extend around the tower 102.

During a forming operation, the fairing members 106 provide a lower structural barrier that is configured to form an outwardly extending flange in a composite material as it is wrapped around the outer forming wall 110. As or after the final layer of composite material is wrapped around the outer forming wall 110, the fairing members 106 may be removed from the tower 102, and the final layer of material may be tucked up underneath the initial layer of material that abuts directly against the outer forming wall 110. Optionally, the fairing members 106 may be removed after the mandrel assembly and the composite materials wrapped around the mandrel assembly are subjected to a curing process.

The upper ring 104 may be a unitary piece having an upper rim 140 secured to a lower edge 142 through a wall 144. The depth of the wall 144 may vary around a circumference of the upper ring 104. The upper rim 140 of the upper ring 104 may include an outer circumferential protuberance 146 that extends outwardly from the wall 144. The upper ring 104 is configured to be positioned within the upper recess 114 that extends around the outer forming wall 110. For example, the lower ledge 116 has a shape that conforms to the shape of the lower edge 142. The lower ledge 116 supports the upper ring 104 on the tower 102.

During operation, as layers of material are wrapped around the mandrel assembly 100 (or after such wrapping), an adhesive, such as a resin, may flow around and over the layers of material. The layer of composite material wrapped around the mandrel assembly 100 is then cured, such as through a curing device (for example, an autoclave). After the curing process, the mandrel assembly 100 may be removed from the curing device, and the upper ring 104 may be removed from the tower 102. By removing the upper ring 104, the component formed through the multiple layers of composite material, is no longer jig-locked to the mandrel assembly 100, and may then be removed from the mandrel assembly 100. The mandrel assembly 100 is further described in U.S. application Ser. No. 14/588,465, entitled "System and Method of Forming a Component Using a Mandrel Assembly," filed Jan. 2, 2015, which is hereby incorporated by reference in its entirety.

After the mandrel assembly 100 having a component secured thereto is removed from the curing device, a component-removal tool assembly may be used to remove the upper ring 104 from the tower 102. After the component has been cured, the adhesion force of the resin may lock the upper ring 104 to the component and/or the tower 102. The component-removal tool assembly is used to demold, separate, or otherwise remove the upper ring 104 from the tower 102 and the component, as explained below. After the upper ring 104 is removed from the tower 102, the same component-removal tool assembly is used to demold, separate, or otherwise remove the component from the tower 102, as explained below.

Figure 3:
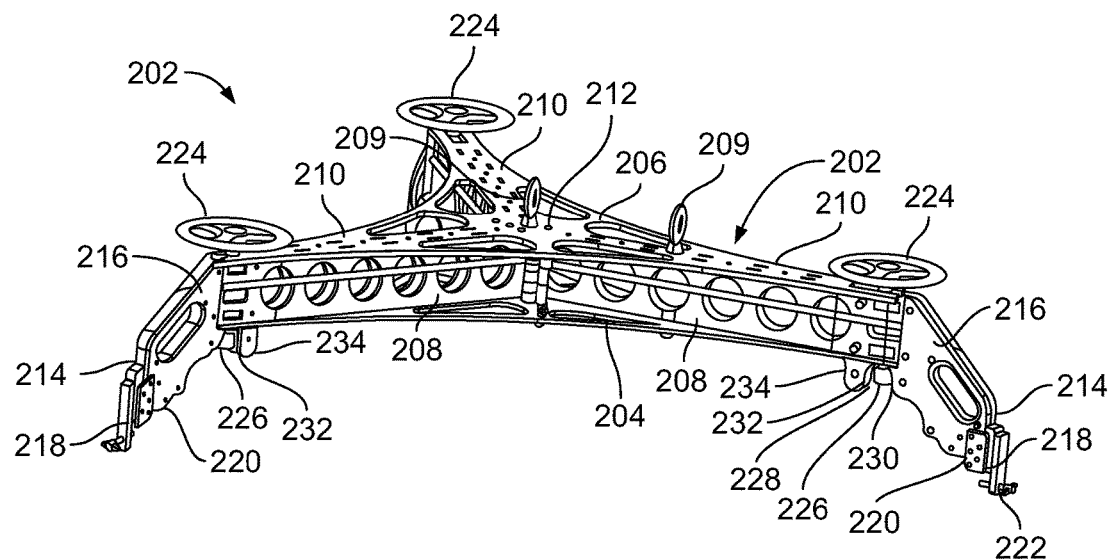
FIG. 3 illustrates a perspective top view of a component-removal tool assembly, according to an embodiment of the present disclosure.

FIG. 3 illustrates a perspective top view of a component-removal tool assembly 200, according to an embodiment of the present disclosure. The component-removal tool assembly 200 may include a main frame 202 having a base 204 connected to an upper wall 206 through one or more lateral walls 208, ribs, spars, and/or the like. Lift rings 209 extend upwardly from the upper wall 206. Each of the lift rings 209 is configured to receive a removal device, such as a hook, clasp, or the like, that may be coupled to a portion of a lifting device, such as crane, fork lift, boom, and/or the like. More of less lift rings 209 than shown may be used.

The main frame 202 may include three regularly-spaced arms 210 extending from a central hub 212. Alternatively, the main frame 202 may include more than three arms 210. A securing bracket 214 may outwardly and downwardly extend from each of the arms 210. Each securing bracket 214 may include a downwardly-canted body 216 having a protuberance 218 (such as a post, stud, bar, and/or the like) extending downwardly from a distal end 220. The protuberance 218 may include a through-hole that is configured to receive a restraining pin 222.

A rotational input device 224 may extend upwardly from the main frame 202 proximate to, and inboard from, each securing bracket 214. The rotational input device 224 is operatively coupled to a plunger 226 that downwardly extends from the main frame 202 within a notch 228 between an interior edge 230 of the securing bracket 214 and an exterior edge 232 of an interior brace 234. The rotational input devices 224 are operatively coupled to a synchronizing link, such as a single, common roller chain (hidden from view in FIG. 3).

Figure 4:
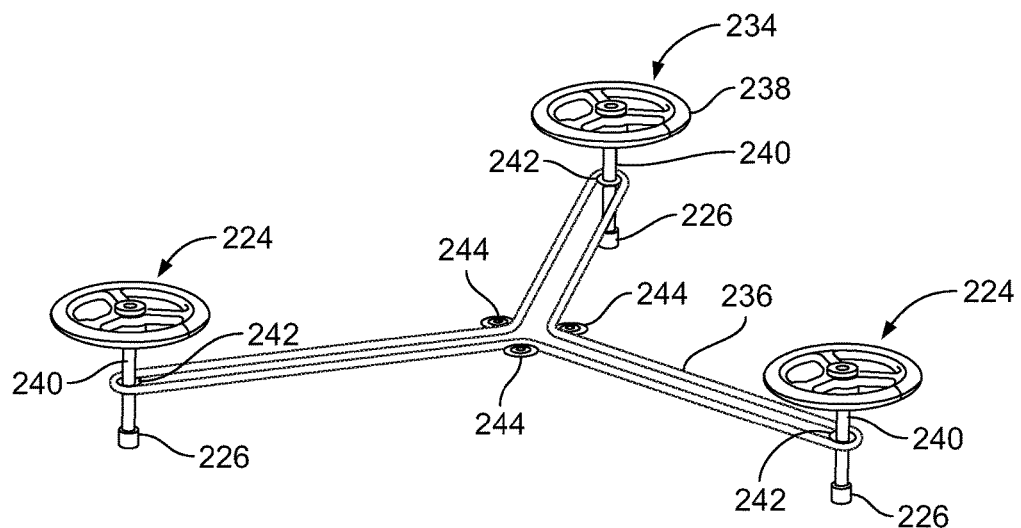
FIG. 4 illustrates a perspective top view of rotational input devices operatively coupled to a single, common roller chain, according to an embodiment of the present disclosure.

FIG. 4 illustrates a perspective top view of rotational input devices 224 operatively coupled to a synchronizing link, such as a single, common roller chain 236, according to an embodiment of the present disclosure. Each rotational input device 224 includes a radial hand or engagement wheel 238 connected to a central threaded axle 240 (such as a shaft, post, column, or the like) that may be moveably coupled to a plunger 226. Rotation of a rotational input device 224 in a first direction (such as a clockwise direction) causes the plunger 226 to downwardly extend (such as away from the engagement wheel 238). Rotation of the rotational input device 224 in a second direction that is opposite from the first direction (such as a counterclockwise direction) causes the plunger to upwardly extend (for example, upwardly retreat back toward the engagement wheel 238). Alternatively, instead of hand wheel, the rotational input devices 224 may be or include a component, such as a rod, column, stud, or other such protuberance that is configured to be rotated, either manually, or by a tool (for example, a drill). In at least one other embodiment, instead of a hand wheel, the rotational input devices 224 may be handles that are configured to be grasped and rotated.

A gear 242 may radially extend outwardly from an outer shaft of the axle 240 of each rotational input device 224. The gear 242 couples each rotational input device 224 to the roller chain 236. The roller chain 236 may be a single contiguous chain that couples to each of the gears 242 of the rotational input devices 224. The roller chain 236 may couple to outer portions of the gears 242 and may couple to inner portions of interior sprockets 244 that are rotatably secured within the central hub 212 of the main frame 202 (shown in FIG. 3). For example, each sprocket 244 may be rotatably coupled to a respective axle secured within the main frame 202. The roller chain 236 synchronizes movement of all of the rotational input devices 224 and plungers 226. That is, movement of one rotational input device 224 causes the other rotational input devices 224 to move at the same rate and same time, thereby causing all of the plungers 226 to move at the same respective rate and same respective time.

Because each of the rotational input devices 224 is coupled to the roller chain 236, all of the rotational input devices 224 are synchronously coupled to one another. As such, rotation of any rotational input device 224 causes the other rotational input devices 224 to rotate in the same manner. As the rotational input devices 224 rotate, the plungers 226 move in a coordinated, synchronized fashion in response thereto. For example, as one rotational input device 224 is rotated in a first direction, all of the rotational input devices 224 rotate in the same direction due to the corresponding movement in the roller chain 236 in relation to the gears 242 and the sprockets 244. In response, each of the plungers 226 moves downwardly at the same rate, time, and force, due to the coordinated, synchronized movement of the rotational input devices 224.

Alternatively, instead of the single, common roller chain 236, other types of synchronizing links may be used to synchronously couple the rotational input devices 224 together. For example, one or more magnetic or electromagnetic couplings may be positioned on portions of the rotational input devices 224, and may be configured to magnetically or electromagnetically couple the rotational input devices 224 together. In at least one other embodiment, one or more connecting wires, lines, strings, strips, or the like may be used to synchronously coordinate movement of the rotational input devices 224. In short, the synchronizing link ensures that movement of all of the rotational input devices 224 is synchronized, such that movement of one rotational input device 224 causes all of the rotational input devices 224 to move at the same rate and the same time to move the plungers 226 accordingly.

Figure 5:
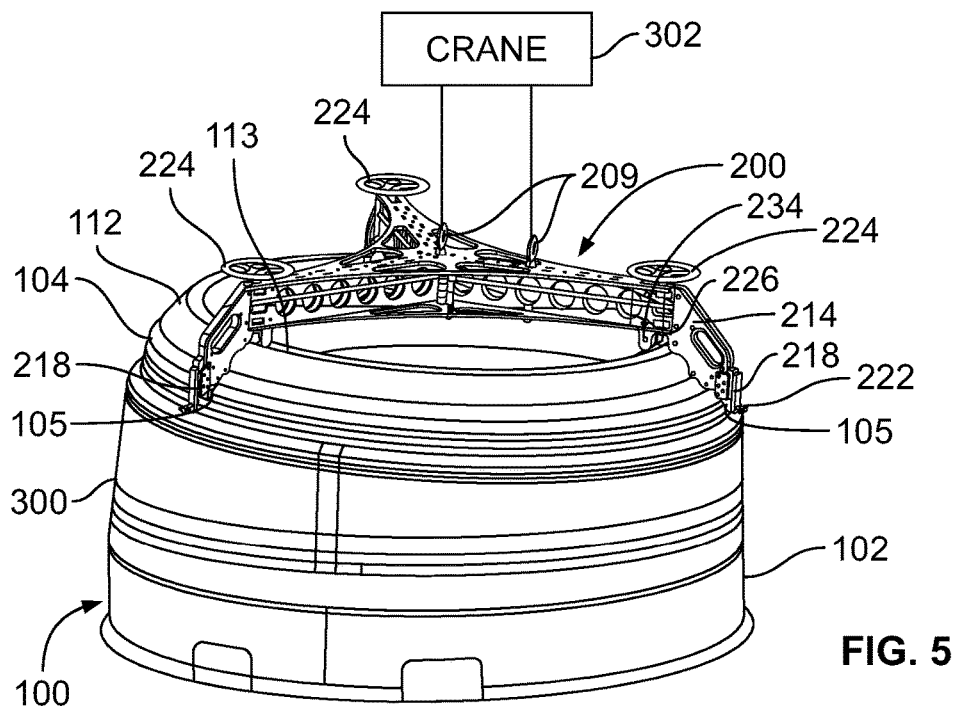
FIG. 5 illustrates a perspective view of a component-removal tool assembly connected to an upper ring of a mandrel assembly having a component secured around a tower, according to an embodiment of the present disclosure.
Figure 6:
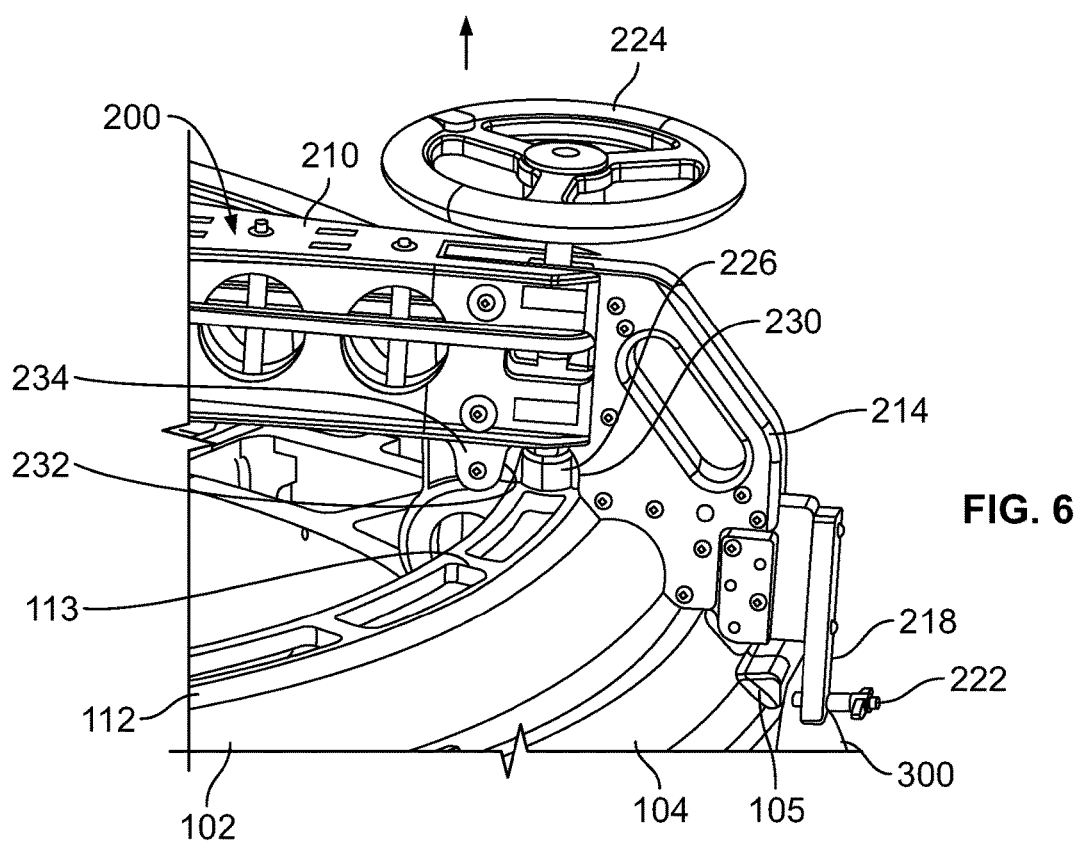
FIG. 6 illustrates a perspective top view of an arm of a component-removal tool assembly locked to an upper ring of a mandrel assembly, according to an embodiment of the present disclosure.

FIG. 5 illustrates a perspective view of the component-removal tool assembly 200 connected to the upper ring 104 of the mandrel assembly 100 having a component 300 secured around the tower 102, according to an embodiment of the present disclosure. FIG. 6 illustrates a perspective top view of an arm 210 of the component-removal tool assembly 200 locked to the upper ring 104 of the mandrel assembly 100. Referring to FIGS. 5 and 6, in order to remove the component 300 from the mandrel assembly 100, the upper ring 104 may first be separated from the tower 102. As such, the component-removal tool assembly 200 may be lowered onto the mandrel assembly 100 through the use of a crane 302. The crane 302 may include lines 304 that connect to the lift rings 209 through securing devices, such as hooks, clamps, or the like.

The crane 302 may position the component-removal tool assembly 200 onto the mandrel assembly 100 such that bottom portions of the plungers 226 abut into a top ledge 113 of the upper rim 112 of the tower 102 of the mandrel assembly 100. The ledge 113 may be positioned between the interior edges 230 of the securing brackets 214 and the exterior edges 232 of the interior braces 234, thereby stabilizing the component-removal tool assembly 200 on the mandrel assembly 100. The component-removal tool assembly 200 may then be radially adjusted to align the protuberances 218 with connection interfaces 105 (such as blocks, tabs, fins, or the like) of the upper ring 104. The connection interfaces 105 may include openings that are configured to receive the restraining pins 222, thereby locking the component-removal tool assembly 200 to the upper ring 104.

After the component-removal tool assembly 200 is securely connected to the upper ring 104, one or more of the rotational input devices 224 may be rotated in a disconnecting direction (such as a clockwise direction). As described above, rotation of one rotational input device 224 causes corresponding motion in the other rotational input devices 224, as all of the rotational input devices 224 are synchronously coupled together through the roller chain 236 (shown in FIG. 3). As the rotational input devices 224 rotate in the disconnecting direction, the plungers 226 exert a downwardly-directed force into the upper rim 112. With increased movement of the plungers 226 towards the upper rim 112, the adhesion force of the resin between the upper ring 104 and the tower 102 (and/or the component 300) is broken, thereby lifting the upper ring 104 upwardly with respect to the tower 102 (such as a distance of one inch). The synchronized movement of the rotational input devices 224 ensures a uniform and controlled separation of the upper ring 104 from the tower 102 and the component 300.

Figure 7:
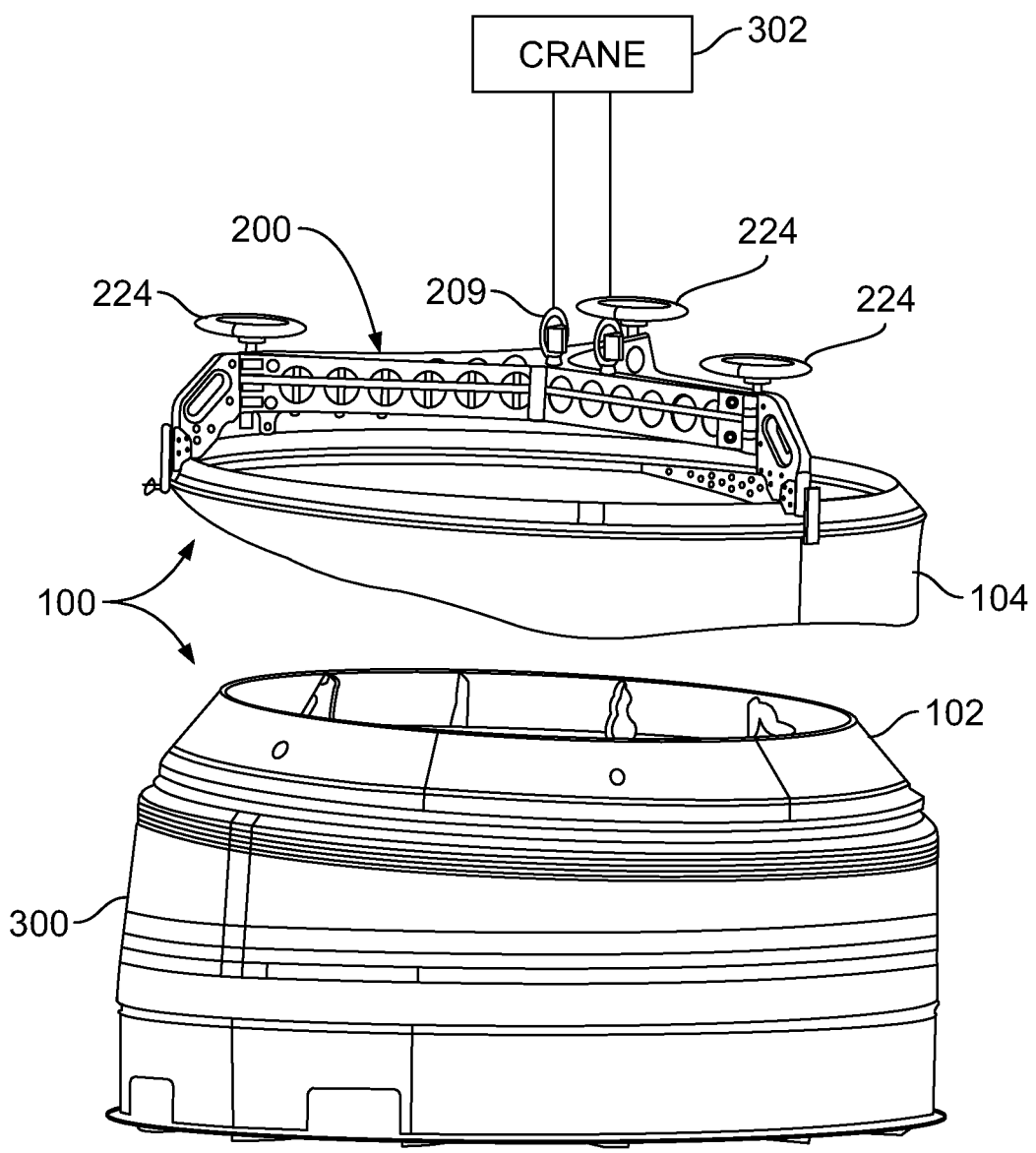
FIG. 7 illustrates a perspective view of an upper ring removed from a tower of a mandrel assembly, according to an embodiment of the present disclosure.

FIG. 7 illustrates a perspective view of the upper ring 104 removed from the tower 102 of the mandrel assembly 100, according to an embodiment of the present disclosure. After the upper ring 104 is separated from the tower 102 and the component 300 (by way of the rotational input devices 224 operating to break the adhesion force between the upper ring 104 and the tower 102 and/or the component 300), the crane 302 is used to lift the upper ring 104 off of the tower 102 and the component 300. The crane 302 then moves the upper ring 104 to a different location, where the upper ring 104 is taken off the component-removal tool assembly 200 (such as by removing the retraining pin 222 from the upper ring 104). After the upper ring 104 is removed from the tower, the component-removal tool assembly 200 may then be used to remove the component 300 from the mandrel assembly 100.

Figure 8:
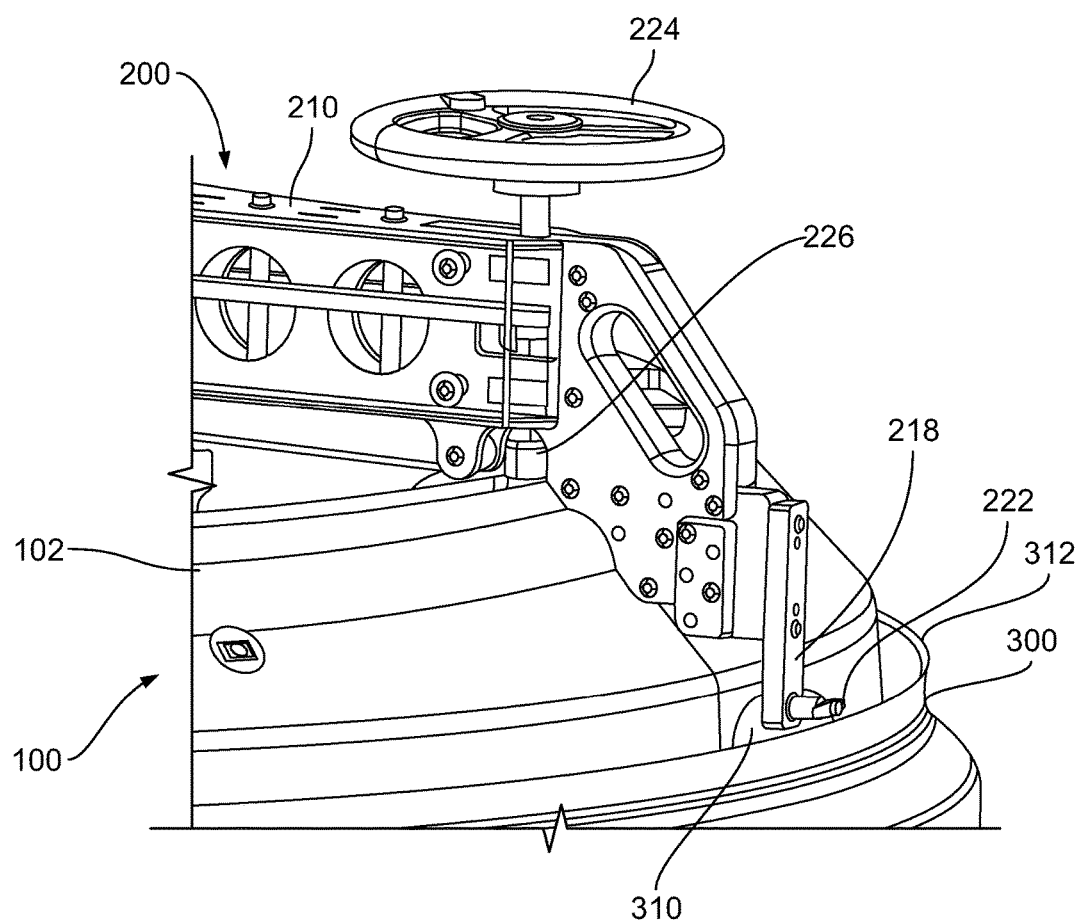
FIG. 8 illustrates a perspective top view of an arm of a component-removal tool assembly locked to a component that is wrapped around a tower of a mandrel assembly, according to an embodiment of the present disclosure.

FIG. 8 illustrates a perspective top view of an arm 210 of the component-removal tool assembly 200 locked to the component 300 that is wrapped around the tower 102 of the mandrel assembly 100, according to an embodiment of the present disclosure. With the upper ring 104 removed from the tower 102, the component-removal tool assembly 200 is moved back onto the tower 102 as described above (such as by the crane 302). The protuberances 218 are aligned with connection tabs 310 extending upwardly from an upper edge 312 of the component 300. The connection tabs 310 include openings that are configured to receive the restraining pins 222, thereby locking the component-removal tool assembly 200 to the component 300. After the component-removal tool assembly 200 is securely locked to the component 300, the rotational input devices 224 are then rotated in the disconnecting direction, as described above. In response, the plungers 226 exert a downwardly-directed force into the tower 102. With continued rotation of the rotational input devices 224 in the disconnecting direction, the plungers 226 exert sufficient force to break the adhesion force of the resin between the component 300 and the tower 102, thereby separating the component 300 from the tower 102. After the component 300 is separated from the tower 102, the crane 302 (shown in FIG. 5) may lift the component 300 off of the tower 102.

Figure 9:
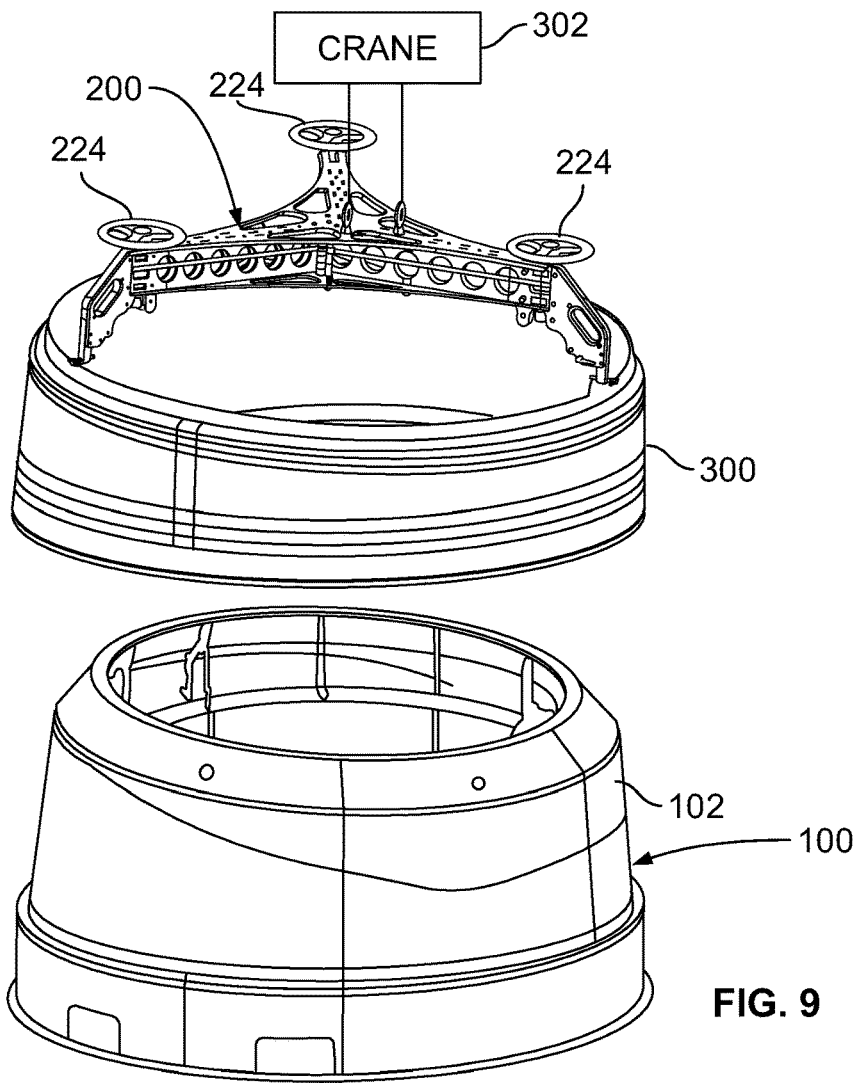
FIG. 9 illustrates a perspective view of a component removed from a tower of a mandrel assembly, according to an embodiment of the present disclosure.

FIG. 9 illustrates a perspective view of the component 300 removed from the tower 102 of the mandrel assembly 100, according to an embodiment of the present disclosure. After the component 300 is separated from the tower 102 (by way of the rotational input devices 224 operating to break the adhesion force between the component 300 and the tower 102), the crane 302 is used to lift the component 300 off the tower 102. The crane 302 then moves the component 300 to a different location, where the component 300 is taken off the component-removal tool assembly 200 (such as by removing the retraining pin 222 from the component 300). As such, the component-removal tool assembly 200 is used to efficiently remove the component 200 from the mandrel assembly 100 in a controlled, uniform, and safe manner.

Referring to FIGS. 1-9, the component-removal tool assembly 200 is used to separate the upper ring 104 from the tower 102, as well as the component 300 from the tower 102. As such, the component-removal tool assembly 200 is a dual-use tool. The mandrel assembly 100 and the component-removal tool assembly 200 cooperate to provide a separating system that is used to remove the upper ring 104 from the tower 102, as well as the component 300 from the tower 102.

As described, embodiments of the present disclosure provide a simple, safe, uniform, and controlled system and method of demolding or otherwise removing a component (such as an acoustic inlet barrel) from a mandrel assembly. The component-removal tool assembly may include a plurality of the rotational input devices 224 operatively connected to the plungers 226 that are coordinated to collectively push against the tower 102 of the mandrel assembly 100 to counteract adhesion forces of resin between the upper ring 104 and the tower 102, as well as the tower 102 and the component 300. The rotational input devices 224 are operatively and synchronously coupled to one another through the common roller chain 236, thereby ensuring that movement of one rotational input device 224 causes the same movement in all of the rotational input devices 224, which causes the same corresponding movement in all of the plungers 226.

As explained above, all of the rotational input devices 224 are synchronized through the common roller chain 236. Movement of one rotational input device 224 causes all of the remaining rotational input devices 224 to rotate at the same rate, which causes all of the plungers 226 to move in a synchronized manner. By synchronizing movement of the rotational input devices 224, the component-removal tool assembly 200 exerts a uniform and consistent disconnecting force, which prevents tilting, jamming, or binding.

Embodiments of the present disclosure may be used to remove various components from a mandrel assembly. For example, the component-removal tool assembly 200 may be used to remove an acoustic inlet barrel from the mandrel assembly 100. The component-removal tool assembly 200 may be used to remove various other circular or ring-like components from a mandrel assembly, such as a portion of a fuselage, a motor casing, and/or the like.

Figure 10:
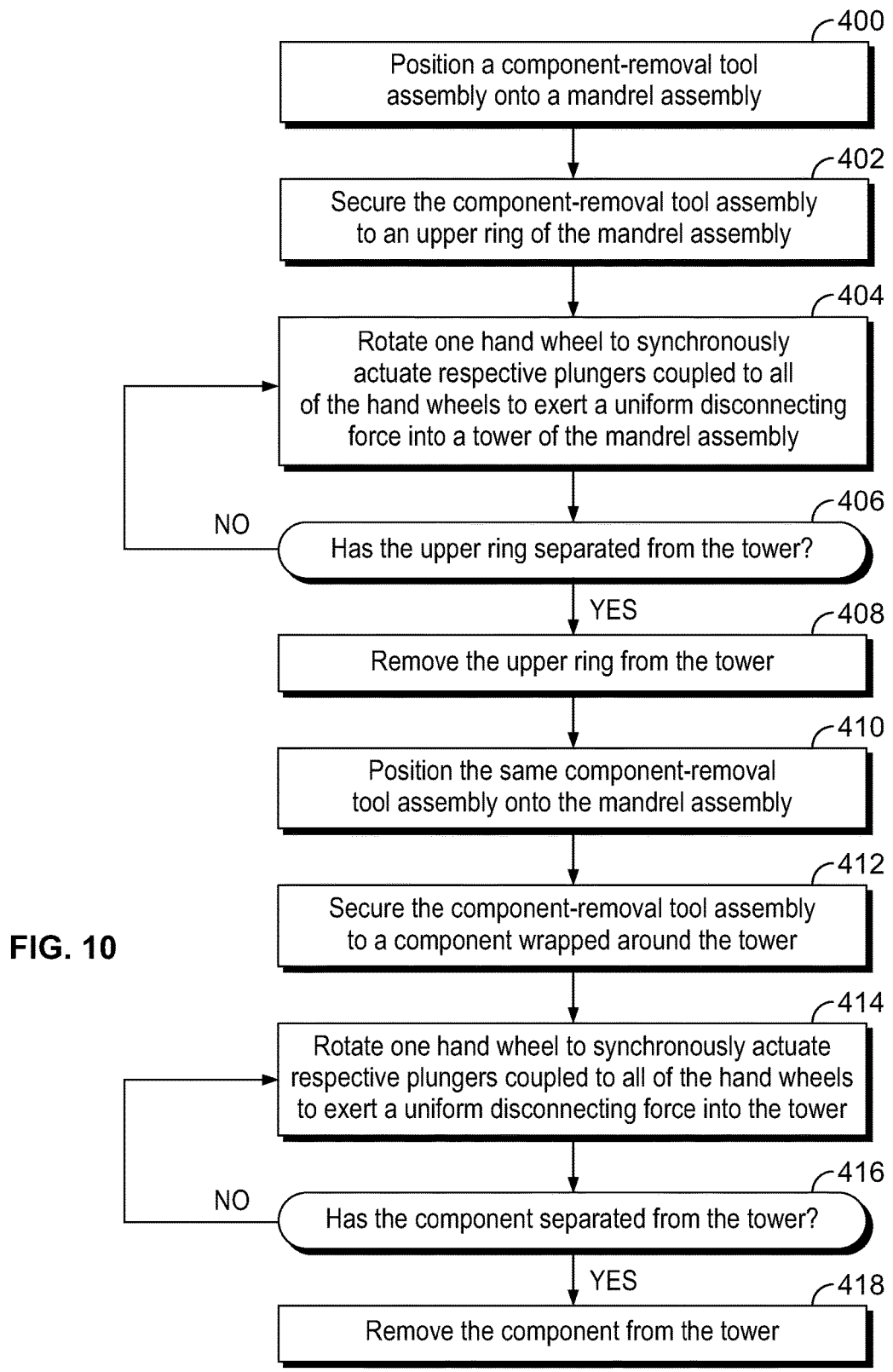
FIG. 10 illustrates a flow chart of a method of removing a component from a mandrel assembly, according to an embodiment of the present disclosure.

FIG. 10 illustrates a flow chart of a method of removing a component from a mandrel assembly, according to an embodiment of the present disclosure. After a component has been formed and cured on a mandrel assembly, the mandrel assembly with the component thereon is removed from a curing device. At 400, a component-remove tool assembly is initially positioned onto the mandrel assembly. At 402, the component removal tool assembly is secured to an upper ring of the mandrel assembly (such as through the use of one or more restraining pins).

At 404, a rotational input device of the component-removal tool assembly is initially rotated, which synchronously actuates respective plungers coupled to all of the rotational input devices, thereby exerting a uniform disconnecting force into a tower of the mandrel assembly. At 406, it is determined if the upper ring has separated from the tower. If the upper ring still adheres to the tower (such as through the adhesion force of resin), the method returns to 404. If, however, the upper ring has separated from the tower, the method proceeds from 406 to 408, in which the upper ring is removed from the tower, such as via a crane.

The upper ring is then removed from the component-removal tool assembly, and the same component-removal tool assembly is repositioned on the mandrel assembly at 410. At 412, the component-removal tool assembly is then secured to a component wrapped around the tower.

At 414, a rotational input device of the component-removal tool assembly is subsequently rotated, which synchronously actuates respective plungers coupled to all of the rotational input devices, thereby exerting a uniform disconnecting force into a tower of the mandrel assembly. At 416, it is determined if the component has separated from the tower. If the component still adheres to the tower (such as through the adhesion force of resin), the method returns to 414. If, however, the component has separated from the tower, the method proceeds from 416 to 418, in which the component is removed from the tower, such as via a crane. The component may then be removed from the component-removal tool assembly.

Figure 11:
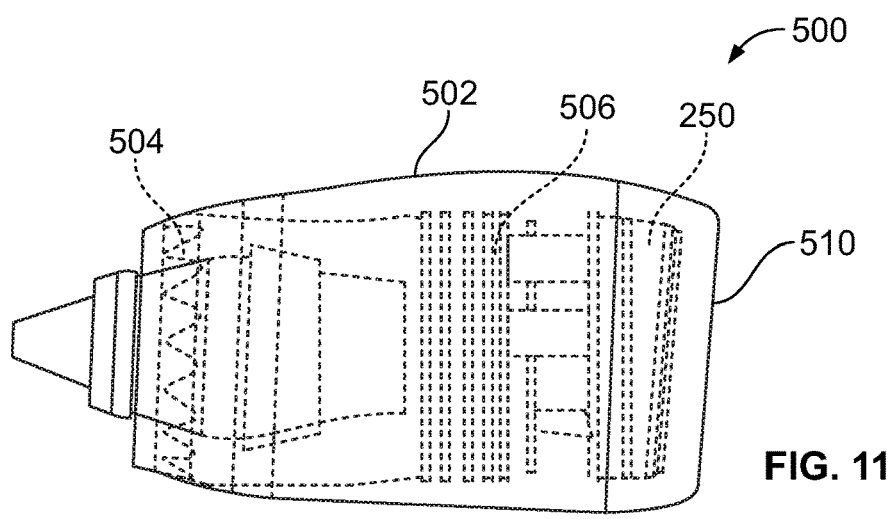
FIG. 11 illustrates an internal view of an aircraft engine, according to an embodiment of the present disclosure.

FIG. 11 illustrates an internal view of an aircraft engine 500, according to an embodiment of the present disclosure.

The aircraft engine 500 includes a main housing 502 that retains a fan 504, an engine 506, and a component 250, such as an acoustic inlet barrel, positioned proximate to an air intake inlet 510 of the aircraft engine 500.

The component 250 is an example of the component 300 described above. The component 250 may be formed and cured on a mandrel assembly, and removed from the mandrel assembly with the component-removal tool assembly 200, as described above.

It is to be understood that embodiments of the present disclosure may be used to form and remove various other types of components, in addition to acoustic inlet barrels. For example, embodiments of the present disclosure may be used to remove various types of circular, ring-shaped, or the like composite components from a mandrel assembly. For example, the components may be portions of a fuselage, engine casings, stages of a rocket or missile, portions of a tubular housing, and/or the like.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A component-removal tool assembly configured to remove a component from a mandrel assembly, the component-removal tool assembly comprising:
   a main frame;
   a plurality of rotational input devices extending from the main frame, wherein each of the plurality of rotational input devices is operatively coupled to a respective plunger that is configured to be actuated against a portion of the mandrel assembly; and
   a synchronizing link that synchronously couples the plurality of rotational input devices together, wherein the synchronizing link operates to synchronize movement of the plurality of rotational input devices, and wherein movement of one or more of the plurality of rotational input devices causes the plungers coupled to the plurality of rotational input devices to exert a uniform and consistent disconnecting force into the mandrel assembly,
   wherein the synchronizing link comprises a single, common roller chain coupled to each of the plurality of rotational input devices, and
   wherein each of the plurality of rotational input devices comprises a gear operatively coupled to the single, common roller chain.

2. The component-removal tool assembly of claim 1, wherein the main frame comprises one or more sprockets operatively coupled to the single, common roller chain.

3. The component-removal tool assembly of claim 1, wherein the main frame comprises one or more lift rings configured to be engaged by a lifting device.

4. The component-removal tool assembly of claim 1, further comprising one or more securing brackets, wherein the one or more securing brackets are configured to removably secure to the component and a portion of the mandrel assembly through one or more restraining pins.

5. The component-removal tool assembly of claim 1, wherein each of the plurality of rotational input devices is threadably coupled to a respective one of the plungers.

6. A separating system comprising:
   a mandrel assembly including an upper ring removably secured to a tower;
   a cured composite component secured around at least a portion of the tower; and
   a component-removal tool assembly configured to initially remove the upper ring from the tower and subsequently remove the component from the tower, the component-removal tool assembly comprising:
   a main frame;
   a plurality of rotational input devices extending from the main frame, wherein each of the plurality of rotational input devices is operatively coupled to a respective plunger that is configured to be actuated against a portion of the mandrel assembly; and
   a synchronizing link that synchronously couples the plurality of rotational input devices together, wherein the synchronizing link operates to synchronize movement of the plurality of rotational input devices, and wherein movement of one or more of the plurality of rotational input devices causes the plungers coupled to the plurality of rotational input devices to exert a uniform and consistent disconnecting force into the mandrel assembly,
wherein the synchronizing link comprises a single, common roller chain coupled to each of the plurality of rotational input devices, and
wherein each of the plurality of rotational input devices comprises a gear operatively coupled to the single, common roller chain,
wherein the component-removal tool assembly is positioned on the tower and secured to the upper ring, wherein at least one of the plurality of rotational input devices is initially rotated to separate the upper ring from the tower, wherein the component-removal tool assembly is initially moved off of the tower to remove the upper ring from the tower, wherein the upper ring is removed from the component-removal tool after the component-removal tool assembly is initially moved off of the tower, wherein the component-removal tool assembly is re-positioned on the tower and secured to the component, wherein at least one of the plurality of rotational input devices is subsequently rotated to separate the component from the tower, wherein the component-removal tool assembly is subsequently moved off of the tower to remove the component from the tower, and wherein the component is removed from the component-removal tool after the component-removal tool assembly is subsequently moved off of the tower.

7. The separating system of claim 6, wherein the main frame comprises one or more sprockets operatively coupled to the single, common roller chain.

8. The separating system of claim 6, wherein the main frame comprises one or more lift rings configured to be engaged by a lifting device.

9. The separating system of claim 6, wherein the component-removal tool assembly further comprises one or more securing brackets, wherein the one or more securing brackets are configured to removably secure to the component and a portion of the mandrel assembly through one or more restraining pins.

10. The separating system of claim 6, wherein each of the plurality of rotational input devices is threadably coupled to a respective one of the plungers.

11. A method of removing a cured, composite component from a mandrel assembly, the method comprising:
coupling a plurality of synchronized rotational input devices of a component-removal tool assembly to a single, common roller chain, wherein the coupling comprises operatively coupling a gear of each of the plurality of synchronized rotational input devices to the single common roller chain;
positioning the component-removal tool assembly on a tower of the mandrel assembly;
securing the component-removal tool assembly to an upper ring that connects to the tower;
initially rotating at least one of the plurality of synchronized rotational input devices in a disconnecting direction to separate the upper ring from the tower
wherein the initially rotating operation causes all of the synchronized rotational input devices to rotate in the disconnecting direction, wherein the initially rotating operation comprises actuating a plurality of plungers operatively coupled to respective ones of the plurality of synchronized rotational input devices into a portion of the tower;
initially moving the component-removal tool assembly off of the tower to remove the upper ring from the tower;
removing the upper ring from the component-removal tool after the component-removal tool assembly is moved off of the tower;
re-positioning the component-removal tool assembly on the tower;
securing the component-removal tool to the component;
subsequently rotating at least one of the plurality of synchronized rotational input devices in the disconnecting direction to separate the component from the tower, wherein the subsequently rotating operation causes all of the synchronized rotational input devices to rotate in the disconnecting direction, wherein the subsequently rotating operation comprises actuating the plurality of plungers operatively coupled to the respective ones of the plurality of synchronized rotational input devices into the portion of the tower;
subsequently moving the component-removal tool assembly off of the tower to remove the component from the tower; and
removing the component from the component-removal tool after the component-removal tool assembly is subsequently moved off of the tower.

12. The method of claim 11, wherein the initially and subsequently moving operations comprise removably connecting the component-removal tool assembly to a lifting device through one or more lift rings.

13. A component-removal tool assembly configured to remove a component from a mandrel assembly, the component-removal tool assembly comprising:
a main frame including one or more sprockets;
a plurality of rotational input devices extending from the main frame, wherein each of the plurality of rotational input devices is operatively coupled to a respective plunger that is configured to be actuated against a portion of the mandrel assembly; and
a synchronizing link that synchronously couples the plurality of rotational input devices together, wherein the synchronizing link operates to synchronize movement of the plurality of rotational input devices, and wherein movement of one or more of the plurality of rotational input devices causes the plungers coupled to the plurality of rotational input devices to exert a uniform and consistent disconnecting force into the mandrel assembly,
wherein the synchronizing link comprises a single, common roller chain coupled to each of the plurality of rotational input devices, and wherein the one or more sprockets are operatively coupled to the single, common roller chain.

14. The component-removal tool assembly of claim 13, wherein the main frame comprises one or more lift rings configured to be engaged by a lifting device.

15. The component-removal tool assembly of claim 13, further comprising one or more securing brackets, wherein the one or more securing brackets are configured to removably secure to the component and a portion of the mandrel assembly through one or more restraining pins.

16. The component-removal tool assembly of claim 13, wherein each of the plurality of rotational input devices is threadably coupled to a respective one of the plungers.

17. A separating system comprising:
a mandrel assembly including an upper ring removably secured to a tower;

a cured composite component secured around at least a portion of the tower; and a component-removal tool assembly configured to initially remove the upper ring from the tower and subsequently remove the component from the tower, the component-removal tool assembly comprising:

a main frame;

a plurality of rotational input devices extending from the main frame, wherein each of the plurality of rotational input devices is operatively coupled to a respective plunger that is configured to be actuated against a portion of the mandrel assembly; and a synchronizing link that synchronously couples the plurality of rotational input devices together, wherein the synchronizing link operates to synchronize movement of the plurality of rotational input devices, and wherein movement of one or more of the plurality of rotational input devices causes the plungers coupled to the plurality of rotational input devices to exert a uniform and consistent disconnecting force into the mandrel assembly, wherein the synchronizing link comprises a single, common roller chain coupled to each of the plurality of rotational input devices, and wherein the main frame comprises one or more sprockets operatively coupled to the single, common roller chain, wherein the component-removal tool assembly is positioned on the tower and secured to the upper ring, wherein at least one of the plurality of rotational input devices is initially rotated to separate the upper ring from the tower, wherein the component-removal tool assembly is initially moved off of the tower to remove the upper ring from the tower, wherein the upper ring is removed from the component-removal tool after the component-removal tool assembly is initially moved off of the tower, wherein the component-removal tool assembly is re-positioned on the tower and secured to the component, wherein at least one of the plurality of rotational input devices is subsequently rotated to separate the component from the tower, wherein the component-removal tool assembly is subsequently moved off of the tower to remove the component from the tower, and wherein the component is removed from the component-removal tool after the component-removal tool assembly is subsequently moved off of the tower.

18. The separating system of claim 17, wherein the main frame comprises one or more lift rings configured to be engaged by a lifting device.

19. The separating system of claim 17, wherein the component-removal tool assembly further comprises one or more securing brackets, wherein the one or more securing brackets are configured to removably secure to the component and a portion of the mandrel assembly through one or more restraining pins.

20. The method of claim 11, wherein the coupling further comprises operatively coupling one or more sprockets of a main frame of the component-removal tool assembly to the single, common roller chain.

* * * * *